United States Patent
Maeda et al.

(10) Patent No.: US 7,848,192 B2
(45) Date of Patent: Dec. 7, 2010

(54) DATA RECORDER AND DATA RECORDING METHOD, AND COMPUTER PROGRAM

(75) Inventors: Tetsuhiro Maeda, Kanagawa (JP); Kenichiro Aridome, Kanagawa (JP)

(73) Assignee: Sony Corporation, Tokyo (JP)

( * ) Notice: Subject to any disclaimer, the term of this patent is extended or adjusted under 35 U.S.C. 154(b) by 429 days.

(21) Appl. No.: 11/994,918

(22) PCT Filed: Apr. 19, 2007

(86) PCT No.: PCT/JP2007/058498

§ 371 (c)(1),
(2), (4) Date: Feb. 21, 2008

(87) PCT Pub. No.: WO2007/129535

PCT Pub. Date: Nov. 15, 2007

(65) Prior Publication Data

US 2008/0198732 A1    Aug. 21, 2008

(30) Foreign Application Priority Data

May 8, 2006    (JP)    ............... 2006-128886

(51) Int. Cl.
*G11B 7/00*    (2006.01)
(52) U.S. Cl. ............... 369/47.13; 369/47.55; 369/59.25
(58) Field of Classification Search ............. 369/47.55, 369/47.13
See application file for complete search history.

(56) References Cited

U.S. PATENT DOCUMENTS

2002/0145966 A1 * 10/2002 Hirotsune et al. ........ 369/275.3
2004/0233798 A1 * 11/2004 Nakamura et al. ........ 369/30.03
2006/0092785 A1    5/2006 Takashima et al.

FOREIGN PATENT DOCUMENTS

| EP | 1 555 672 A1 | 7/2005 |
|---|---|---|
| JP | 2003 168265 | 6/2003 |
| JP | 2003 331509 | 11/2003 |
| JP | 2006 114188 | 4/2006 |

OTHER PUBLICATIONS

"Volume and File Structure for Write-Once and Rewritable Media using Non-Sequential Recording for Information Interchange", Standard ECMA-167, ECMA Standardizing Information and Communication Systems, $3^{rd}$ Edition—Jun. 1997, Part 1 to Part 5, Jul. 2, 1997, 127 pages.
U.S. Appl. No. 11/994,653, filed Jan. 4, 2008, Maeda et al.

* cited by examiner

*Primary Examiner*—Lixi Chow
(74) *Attorney, Agent, or Firm*—Oblon, Spivak, McClelland, Maier & Neustadt, L.L.P.

(57) ABSTRACT

Additional recording is performed on a recording medium without using a VAT technique.

An area including the 256th logical sector is reserved at disc initialization time, and additional recording is performed from this reserved area and after. Additional recording is performed by writing packets from a logical sector immediately after a recorded area (including the reserved area), and AVDP is recorded into two places having the last logical sector number N of a packet structure and a logical sector number less than 256 sectors from N, and thus additional recording in compliance with the UDF is possible after that. At the time of finalization, AVDP is recorded in the 256th logical sector, a surplus area in the reserved area is subjected to padding to ensure wide compatibility with playback-only apparatuses.

5 Claims, 8 Drawing Sheets

DATA RECORDER AND DATA RECORDING METHOD, AND COMPUTER PROGRAM

TECHNICAL FIELD

The present invention relates to a data recording apparatus, a data recording method, and a computer program which record data on a recording medium, and relates to a data recording apparatus, a data recording method, and a computer program which additionally record data onto an only-once recordable optical disc, such as a DVD-R, a DVD+R, and a CD-R, for example.

More specifically, the present invention relates to a data recording apparatus, a data recording method, and a computer program which additionally record data on a recording medium a plurality of times in a format complying with the UDF (Universal Disk Format)(a registered trademark) defined by OSTA (Optical Storage Technology Association), and in particular relates to a data recording apparatus, a data recording method, and a computer program which additionally record data on a recordable recording medium a plurality of times in a playable state by a playback-only apparatus.

BACKGROUND ART

A disc-type recording medium (in the following, called an "optical disc"), to which optical reading is applied, such as a DVD (Digital Versatile Disk), a CD (Compact Disk), etc., has rapidly become widespread for use in storing computer files and moving-image streams. An optical disc has a large storage capacity and is capable of random accessing. Also, unlike a contact-type magnetic recording medium, there is no concern for abrasion and damage on the recording face by reading, head crash, etc. Also, the disc surface is strong, and there is low risk of accidental data loss. In recent years, recording/playback apparatuses using optical discs, such as a DVD-R, a DVD+R, and a CD-R have also been developed and manufactured, and the optical discs are widely used, for example, for external recording media and external storage devices for computers.

For example, the UDF (Universal Disk Format)(a registered trademark) defined by OSTA (Optical Storage Technology Association) is known as an optical disc format having high compatibility (For example, refer to Non-patent document 1). The UDF corresponds to an implementation technique of the ISO/IEC 13346 standard (the ISO/IEC 13346 is a successor of ISO9660, and is corresponding to increases in disc capacity and the number of files), which is known as ECMA (European Computer Manufacturer Association) -167 (For example, refer to Non-patent Document 2). In 1990s, the UDF has become wide spread for use as a writable optical disc together with price reduction of CR-RW media and CD recording apparatuses.

In the UDF, by adopting a packet-writing method, it is possible to perform processing, such as addition or deletion of a file to an optical disc through a normal file system. In the packet-writing method mentioned here, data is written with a packet structure in which a link block and four Run-In areas are provided before user data, and two Run-Out areas are provided at the end of the user data. The seven blocks are used as link areas (Linking Area), which are junction areas between adjacent packets except for the user data area. It is possible to write into the UDF from almost all the Operating Systems (OS), also the written files are file systems whose playback compatibility is achieved on the OSs without any special read programs, and the contents in an optical disc can be operated in the same method as a hard disk, a floppy disk, a USB (Universal Serial Bus) flash memory. However, in the cases of a recordable recording medium, such as a DVD-R, a DVD+R, and a CD-R, etc., deleted files are erased only from a directory, and are left as they are in the recording medium.

In the case of a recordable disc, such as a DVD-R, a CD-R, etc., there are restrictions that writing in a physical sector can be carried out only once, and data must be written continuously (incrementaly) toward the outer circumference without placing free logical sectors. This means that in the original UDF format, after data is pre-mastered, all the data must be written in one piece into a medium (similarly to the way of writing into CD media by ISO9660).

Thus, in order to allow files on a CD-R and a DVD-R to be modified virtually in the same manner as a hard disk, OSTA added a Virtual Allocation Table (in the following, called a "VAT") and a method of recording using Virtual Partition Map to the UDF standard. The VAT is an additional data structure, on a disc, including a table for managing logical addresses at which files are actually recorded and virtual addresses corresponding to the logical addresses. When a file on a disc, or the other data is changed, a logical address can be relocated using the VAT, and thus it is possible to handle a medium to be written sequentially as if it is a medium allowing random reading and writing.

Accordingly, by attaching a VAT to a disc recording apparatus, it becomes possible for an only-once recordable recording medium, such as a DVD-R, a DVD+R, and a CD-R to record additionally.

The position of a VAT can be placed freely in a packet structure, but a VAT ICB (Information Control Block) pointing a VAT is determined to be placed at a sector backward as much as a link area from the final sector of the recorded area. For example, a proposal has been made of a data recording and playback apparatus (for example, refer to Patent Document 1) in which at data playback time, past recording data left on a recording medium can be referenced by reading a VAT other than the VAT recorded at the final end of the recorded area of the recording medium, and at data recording time, the VAT recorded on a recording medium is read in order to additionally record next to the final end of the recorded area of the recording medium. By this apparatus, at playback time, past record data left on the recording medium can be referenced by reading a VAT other than the VAT recorded at the final end of the recorded area, and at recording time, it is possible to restore a past recording state.

Here, in consideration of the convenience of a user, it is preferable that a recording medium additionally recorded in compliance with the UDF can be played back by a playback-only apparatus before being subjected to special processing, such as finalization, etc., that is to say, in a state of allowing additional recording. For example, still images, moving images, etc., captured by a digital camera and recorded on a DVD are taken out, loaded into a DVD player for outputting and displaying the images, and then loaded again into the digital camera to capture images.

However, many of disc-playback-only apparatuses which have already become widespread now, do not include VATs, and thus it is not possible for the disc recording apparatuses to maintain the compatibility with these existing disc-playback-only apparatuses. For example, there are reports from users that a moving-image DVD produced by a personal computer failed to be played back by set-top DVD players. The cause depends on whether the UDF to which each apparatus complies supports VAT or not. It is thought that disc-playback-only apparatuses to be on the market in the future is provided with VAT, but there is a problem in that the cost of the apparatuses will increase.

Patent Document 1

Japanese Unexamined Patent Application Publication No. 2001-351336

Non-Patent Document 1 http://www.osta.org/specs/index.htm

Non-Patent Document 2 http://www.ecma-international.org/publications/standards/Ecma-167.htm

DISCLOSURE OF INVENTION

Problems to be Solved by the Invention

It is an object of the present invention to provide an excellent data recording apparatus, data recording method, and computer program which are capable of preferably recording data additionally onto a recordable (allowing to write only once) optical disc, for example a DVD-R, a DVD+R, and a CD-R.

It is another object of the present invention to provide an excellent data recording apparatus, data recording method, and computer program which are capable of preferably performing an additional data recording operation on a recording medium a plurality of times in a format complying with the UDF defined by the OSTA.

It is another object of the present invention to provide an excellent data recording apparatus, data recording method, and computer program which are capable of additionally recording on a recordable recording medium a plurality of times in a state allowing to be played back by a playback-only apparatus.

It is another object of the present invention to provide an excellent data recording apparatus, data recording method, and computer program which are capable of always keeping a recording medium in a playable state by a playback-only apparatus by performing additional recording on the recording medium without using Virtual Allocation Table and Virtual Partition Map.

Means for Solving the Problems

The present invention has been made in view of the above-described problems, and according to a first aspect of the invention, there is provided a data recording apparatus for performing additional recording on a disc including a plurality of logical sectors in compliance with a predetermined file system format, in the predetermined file system format, reference information to file system data is determined to be recorded at least in two places out of three places of a first logical sector of a disc-inner circumference, a second and a third logical sectors of an inner circumference from a last-recorded logical sector, the data recording apparatus including:

disc-initialization means for recording standard information at a predetermined logical sector position from an innermost circumference of the disc, reserving an area from immediately after the recording of the standard information to immediately before a fourth logical sector being a file-data recording start position including the first logical sector, and performing initialization of the disc; and additional recording means for recording file data and file system data continuously from the fourth logical sector (note that in the case of a disc of immediately after the initialization and having no recorded file data) being immediately after the reserved area or a logical sector immediately after recorded area, and recording reference information to the file system data in two places, the second and the third logical sectors of an inner circumference from the last-recorded logical sector.

The present invention relates to a data recording apparatus which performs additional recording on a recording medium, such as an optical disc a plurality of times, for example on the basis of a file system complying with the UDF defined by the OSTA.

In order to allow files on a CD-R and a DVD-R to be modified virtually in the same manner as a hard disk, the OSTA added a Virtual Allocation Table (in the following, called a "VAT") and a method of recording using a Virtual Partition Map to the UDF standard.

Here, in consideration of the convenience of a user, it is preferable that a recording medium additionally recorded in compliance with the UDF can be played back by a playback-only apparatus before being subjected to special processing, such as finalization, etc., that is to say, in a state of allowing additional recording. However, however, many of disc-playback-only apparatuses which have already become widespread now, do not include VATs, and thus it is not necessarily preferable.

Also, in the UDF, as one of restrictions and essential conditions on writing each data field, it is determined that AVDP (Anchor Volume Descriptor Pointer) as pointer information to a VDS describing a volume structure is recorded at least in two places out of three places of the 256th logical sector number, the last recorded sector number N, and a logical sector number less than 256 sectors from N.

Each time additional recording is performed on a disc, AVDP is recorded into two places having the last logical sector number N of a packet structure and having a logical sector number less than 256 sectors from N, and thus additional recording is possible for a plurality of times. However, it is desirable to finally record AVDP in the 256th logical sector, which is difficult to be damaged. On the other hand, the information on VDS is determined at the time of recording AVDP in the 256th logical sector, and thus it becomes impossible to additionally record on the disc in a form complying with the UDF.

Thus, in a data recording apparatus according to the present invention, an area including the 256th logical sector is reserved so as to be brought into a state of allowing a final AVDP to be written into the 256th logical sector, and data recording is determined to be performed from this reserved area and after. The reserved area is kept in a reserved state until an explicit instruction is given by special processing, such as finalization, etc.

When additional recording is performed on a disc after having been initialized, packets are started to be written from a logical sector immediately after the recorded area (including the reserved area). In a packet structure, user data is written from an inner circumferential logical sector toward an outer circumference, and next, file system data is written immediately after that without leaving unrecorded area.

The file system data includes a VDS (Volume Descriptor Sequence), which is a descriptor describing information on the contents of a volume structure, and this VDS is pointed by an AVDP. In the UDF, a VDS is allowed to be freely placed in the packet structure, but restrictions and essential conditions are imposed on the position of the AVDP. In the present invention, when additional recording is performed, an AVDP is placed in two places of the last logical sector number N in the recorded area and a logical sector number less than 256 sectors from N, and thus additional recording is made possible in a form complying with the UDF after that.

After that, it is possible to additionally record on the disc a plurality of times by writing the similar packets in sequence until special processing, such as finalization is performed unless the recording reaches the upper limit of a recording capacity.

When an explicit instruction is given by special processing, such as finalization, etc., an AVDP is recorded in the 256th logical sector, which is a reserved area, and the surplus area of the reserved area is subjected to padding, and thus, finally it is possible to record an AVDP in the 256th logical sector, which is difficult to be damaged. Also, by placing an AVDP in the 256th logical sector, it is possible to ensure compatibility with playback-only apparatuses widely.

Also, according to a second aspect of the invention, there is provided a computer program described in a computer-readable format to cause a computer to execute processing for performing additional recording on a disc including a plurality of logical sectors in compliance with a predetermined file system format, in the predetermined file system format, reference information to file system data is determined to be recorded at least in two places out of three places of a first logical sector of a disc-inner circumference, a second and a third logical sectors of an inner circumference from a last-recorded logical sector, the processing including the steps of:

disc-initializing for recording standard information at a predetermined logical sector position from an innermost circumference of the disc, reserving an area from immediately after the recording of the standard information to immediately before a fourth logical sector being a file-data recording start position including the first logical sector, and performing initialization of the disc;

additional recording for recording file data and file system data continuously from the fourth logical sector (note that in the case of a disc of immediately after the initialization and having no recorded file data) being immediately after the reserved area or a logical sector immediately after recorded area, and recording reference information to the file system data in two places, the second and the third logical sectors of an inner circumference from a last-recorded logical sector; and when completing additionally recording on a disc, finalization processing for padding with dummy data from an inner circumference of the reserved area to immediately before the first logical sector, starting recording of reference information to the last additionally recorded file system data, and padding with dummy data an area from immediately after the recorded reference information to immediately before the fourth logical sector.

A computer program according to the second aspect of the present invention is a defined computer program described in a computer-readable format so as to achieve predetermined processing on a computer. In other words, by installing a computer program according to the second aspect of the present invention, a cooperative operation is exercised on that computer, and the same operation effects as those of the information processing apparatus according to the first aspect of the present invention can be obtained.

Advantages

By the present invention, it is possible to provide an excellent data recording apparatus, data recording method, and computer program which are capable of preferably performing an additional data recording operation on a recording medium a plurality of times in a format complying with the UDF defined by the OSTA.

Also, by the present invention, it is possible to provide an excellent data recording apparatus, data recording method, and computer program which are capable of additionally recording on a recordable recording medium a plurality of times in a state allowing to be played back by a playback-only apparatus.

A data recording apparatus according to the present invention performs additional recording on a recording medium without using a Virtual Allocation Table and a Virtual Partition Map, and thus it is possible to always keep a recording medium, on which additional recording has been sequentially performed, in a playable state by a playback-only apparatus.

By a data recording apparatus according to the present invention, an area including the 256th logical sector is reserved at initialization time, additional recording is performed from this reserved area and after by writing packets, AVDP is recorded into two places having the last logical sector number N of the recorded area and a logical sector number less than 256 sectors from N, and thus additional recording in a form complying with the UDF is also possible after that. When explicitly instructed by special processing, such as finalization, it is possible to ensure wide compatibility with playback-only apparatuses by recording AVDP in the 256th logical sector, which is the reserved area.

Other and further objects, features and advantages of the present invention will become apparent by the detailed description based on the following embodiments of the present invention and the accompanying drawings.

Figure 1:
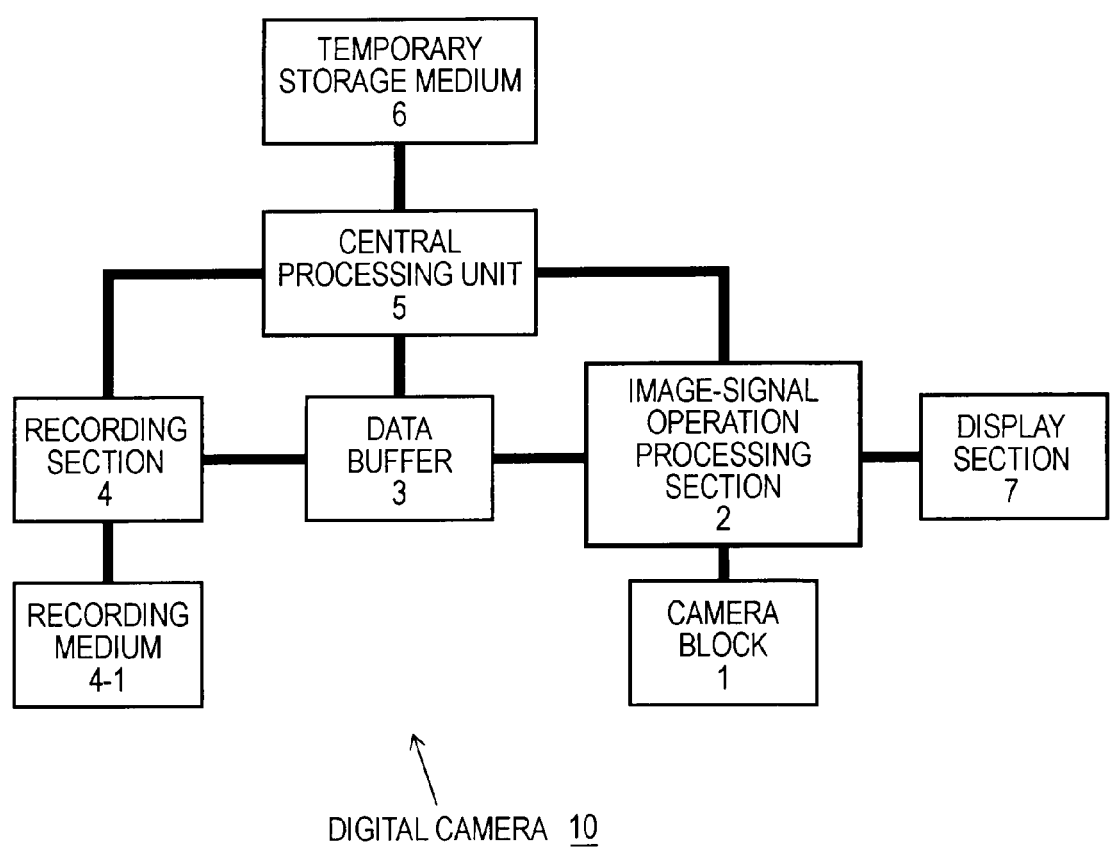
FIG. 1 is a diagram schematically illustrating a hardware configuration of a digital camera 10 according to an embodiment of the present invention.

REFERENCE NUMERALS 1 camera block
2 image-signal operation section
3 data buffer
4 recording section
5 central processing unit 6 temporary storage medium
10 digital camera
13 OP section
14 RF processing section
15 servo-signal processing section
16 analog filter section
17 signal processing section
18 spindle driver
19 thread driver
20 tracking driver
21 focus driver
22 spindle motor
23 thread motor
25 recording medium (optical disc)

BEST MODE FOR CARRYING OUT THE INVENTION

In the following, a detailed description will be given of an embodiment of the present invention with reference to the drawings.

Apparatus Configuration:

In a data recording apparatus according to the present invention, data is additionally recorded a plurality of times on a recording medium, such as an only-once recordable optical disc, for example a DVD-R, a DVD+R, and a CD-R on the basis of a file system complying with the UDF defined by OSTA. As one typical example of the configuration of the apparatus, a digital camera which digitizes an image captured by a solid-state imaging device can be given.

FIG. 1 schematically illustrates a hardware configuration of a digital camera 10 according to an embodiment of the present invention.

A camera block 1, which captures an image of an object of shooing, includes a lens for taking in the image of the object of shooing, a solid-state imaging device such as a CCD (Charge Coupled Device), a CMOS (Complementary Metal-Oxide Semiconductor), etc., for generating an electrical image signal in response to incident light by photoelectric conversion, an A/D converter for performing digital conversion of the image signal, a demosaic processing for calculating an RGB signal from a digital image signal, and the like (omitted to be shown in the figure).

An image-signal operation processing section 2 performs the color-reference system conversion from the RGB signal to chrominance and luminance signals, encoding compression processing to the JPEG and the MPEG formats, etc., and the like. Also, the image-signal operation processing section 2 supplies the processed image signal to a display section 7 including a liquid crystal display (Liquid Crystal Display: LCD), etc., to output images.

A recording section 4 receives an image file having been subjected to encoding compression by the image-signal operation processing section 2 through a data buffer 3, and records the image file on a recording medium 4-1, such as a loaded optical disc. In the present embodiment, data is additionally recorded on the recording medium 4-1 a plurality of times on the basis of a file system in compliance with the UDF defined by OSTA, the details of which will be described later.

A central processing unit 5 loads execution programs onto a temporary storage medium 6 including a RAM (Random Access Memory), etc., and totally controls the processing operations of the entire digital camera 10 in a form of executing programs under the execution environment provided by an OS while temporarily storing system variables and environment variables. The processing operations mentioned here include moving-image capturing by the camera block 1, accompanying camera works, such as an auto focus function, automatic exposure, camera shake compensation, and auto shutter, and data recording on the recording medium 4-1 by the recording section 4.

Figure 2:
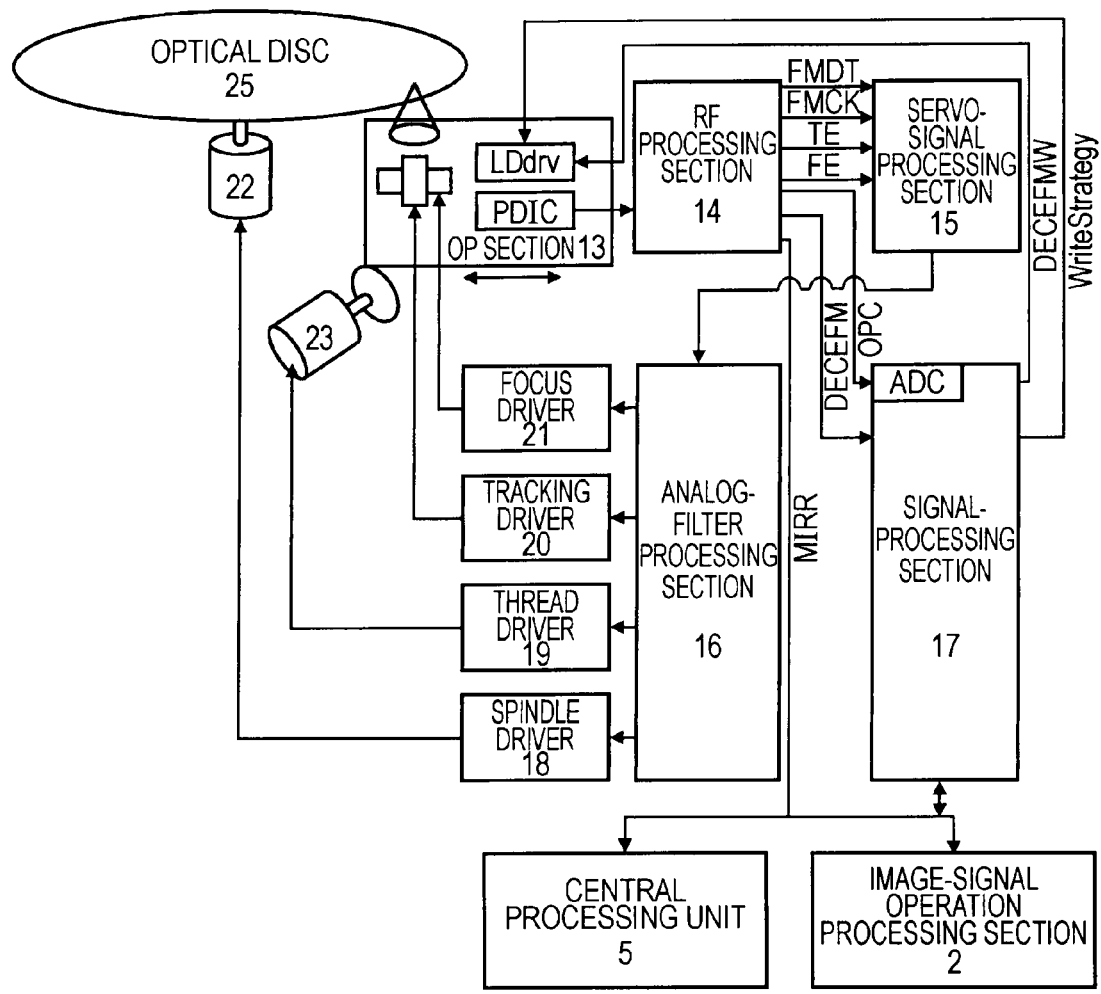
FIG. 2 is a diagram illustrating an internal hardware configuration of a recording section 4.

FIG. 2 illustrates an internal hardware configuration of the recording section 4.

An OP (Optical Pickup) section 13 includes an objective lens, a laser diode (LD), a laser diode driver (LDdrv), a photo detect IC (Photo Detect IC), a half mirror, etc. At data playback time, the OP section 13 detects a reflected light signal from a recording surface of an optical disc 25 against irradiated laser light, and outputs it to an RF processing section 14. Also, at data recording time, the OP section 13 writes data on the optical disc 25 on the basis of a laser flashing and driving signal DECEFMW and a write strategy signal (WriteStrategy) signal indicating an optimum value of a laser intensity and blinking, which are necessary for forming pits, from a signal processing section 17. The write strategy is a technique which modifies a laser pulse in a time direction and a level direction at write time for each pit such that the pit size after the writing satisfies the standard.

The RF processing section 14 performs sampling and holding on eight-system signals including a beam signal, a side, and a main which are detected by the OP section 13, performs operation processing, and generates signals of, such as an FE (focus error), a TE (tracking error), a MIRR (mirror), ATIP (Absolute Time In Pregroove), a read main signal, etc., from predetermined signals out of the eight-system signals. The RF processing section 14 outputs FMDT (frequency modulation data), FMCK (frequency modulation clock), TE, and FE out of the generated signals to a servo-signal processing section 15, outputs an optimum value (OPC: Optical Power Calibration) signal of the laser intensity detected by a trial writing and the laser flashing and driving signal DECEFM to the signal-processing section 17, and outputs MIRR to the central processing unit 5.

When the servo-signal processing section 15 receives input of FMDT, FMCK, TE, and FE from the RF processing section 14, the servo-signal processing section 15 generates various servo-control signals specific to an optical disc by an instruction from the central processing unit 5, and outputs the signals to an analog-filter processing section 16.

The analog-filter processing section 16 generates an analog signal on the basis of the various servo-control signals from the servo-signal processing section 15, and outputs the signal to a spindle driver 18, a thread driver 19, a tracking driver 20, and a focus driver 21.

The signal processing section 17 receives input of OPC and DECEFM from the RF processing section 14 under the control of the central processing unit 5, and performs CIRC (Cross Interleave Reed-Solomon Code) decoding and encoding, a write strategy, ADDr decode, asymmetry, running OPC, etc. When the signal processing section 17 writes data on the optical disc 25, the signal processing section 17 outputs the laser flashing and driving signal (DECEFMW) and the signal indicating an optimum value of the laser intensity (WriteStrategy), etc., to a laser diode driver (LDdrv) in the OP section 13.

The spindle driver 18 controls the rotation of a spindle motor 22 on the basis of a signal from the analog-filter processing section 16. The thread driver 19 controls a thread operation of a thread motor 23 on the basis of a signal from the analog-filter processing section 16. The tracking driver 20 oscillates the OP section 13 on the basis of a signal from the analog-filter processing section 16 to control the position of a beam spot irradiated on the recording surface of the optical disc 25. The focus driver 21 moves the OP section 13 in a perpendicular direction with respect to the recording surface of the optical disc 25 on the basis of a signal from the analog-filter processing section 16 to control focus adjustment of laser. The spindle motor 22 rotates the optical disc 25 on the basis of a signal from the spindle driver 18. The thread motor 23 performs a thread operation of the OP section 13 on the basis of a signal from the thread driver 19.

The central processing unit 5 uses the temporary storage medium 6 as a work memory (described above), and stores the file system data on the UDF file system to be updated in each case, for example together with update, addition, deletion, etc., of a file and a directory until immediately before the main power of the apparatus 1 is turned off.

When data is read from the optical disc 25, the light of the laser diode reflected from the recording surface is read by the lens optical system of the OP section 13. The light from the lens optical system is converted into an electrical signal by a PDIC, is sampled and held in the RF processing section 14, and signals, such as FE, TE, MIRR, ATIP, a read main signal, etc., are generated from eight individual signals by operation processing.

First, the FE obtained by the RF processing section 14 is subjected to characteristic adjustment by the servo-signal processing section 15, undergoes the analog-filter processing section 16, and is input into the focus driver 21. The focus driver 21 moves a lens-drive focus coil (not shown in the figure) of the OP section 13 in the vertical direction to modify the deviation of the focus.

Also, the TE obtained by the RF processing section 14 is subjected to AC-component extraction and digital filter processing by the servo-signal processing section 15, undergoes the analog-filter processing section 16, and is input into the tracking driver 20. The tracking driver 20 slightly moves a lens-drive tracking coil of the OP section 13 in the radial direction to modify the deviation of the tracking.

Also, the TE obtained by the RF processing section 14 is subjected to DC-component extraction and digital filter processing by the servo-signal processing section 15, undergoes the analog-filter processing section 16, and is input into the thread driver 19. The thread driver 19 operates the thread motor to move the entire OP section 13 in the radial direction of the recording medium to modify the deviation of the thread operation. At the time of seek operation, the thread motor is compulsorily driven by intentionally applying the thread control voltage from the outside.

In this manner, the tracking operation which slightly moves only the lens in the radial direction is performed on the basis of the AC components of the TE, and the thread operation which moves the entire OP section 13 in the radial direction is performed on the basis of the DC components.

The detection signal (mirror) of a change of the reflection ratio of the recording medium output from the RF processing section 14 is detected when the OP section 13 passes over a track, and thus by counting mirror, the current seek position and the read position are detected, and the optical pickup operation is started and stopped.

The control of the spindle motor 22 is performed on the basis of the ATIP processing. Time information is recorded in a winding groove called a wobble (Wobble) groove written on the optical disc 25 in the radial direction by a central frequency of 22.05 KHz and with a FM modulation of +/−1 KHz. The modulated information is the time information called ATIP, which has been subjected to Bi-Phase modulation.

When the focus matches the tracking, the RF-signal processing section 14 takes out a wobbling signal from a predetermined combinations of the input eight signals. The FM modulation and the ATIP decoding is performed to take out as FMCK and FMDT. In the servo-signal processing section, FMDT is stored in a predetermined register classified as an absolute time position of the optical disc 25, that is to say, an address and the other additional information. Data is read in accordance with it.

In the RF-signal processing section 14, a signal corresponding to the recorded pit is taken out from the predetermined nation of eight signals, is subjected to equalizing processing, and then is supplied to the signal processing section 17 in the form of EFM (Eight to Fourteen Modulation) signal without change. The signal processing section 17 performs decoding on the basis of CIRC to allow obtaining desired data.

When data is written on the optical disc 25, first, a pickup is moved to a read-in area to read the ATIP information. Furthermore, special information portion is read from it to know the start position of the read-in area. The start position is usually stored as time information. The information written in the special information corresponds to an individual identification code of the optical disc 25. The apparatus 1 stores the write-strategy parameter and the other related parameters corresponding to the individual identification code as a table in advance. The correction parameters are provided in advance for each recording medium.

Next, the OPC (Optical Power Caribration) operation for determining the optimum value of the laser output is performed. The above-described write-strategy writing is the detailed control on the laser for each write pit, whereas the OPC is the operation for calculating the entire optimum value. By performing the OPC, the write setting values corresponding to an ideal read target value is obtained.

Writing data is performed by performing CIRC and EFM encoding processing on the compressed captured image data provided in the data buffer 3, and then the data is input into the laser driver of the OP section 13 as a flashing and driving signal and a write strategy signal, which are necessary for forming a pit. At this time, writing is performed in accordance with the file system at in exact timing with a predetermined position on the basis of the frame unit address obtained from the FMDT signal obtained by decoding ATIP. At the first writing, writing is started from the position which has skipped an area of about 20 Mbytes to be a read-in area at the time of closing a session later.

Additional Recording Operation on an Optical Disc

The data recording apparatus 1 according to the present embodiment performs data recording on the optical disc 25 on the basis of the file system complying with the UDF defined by OSTA. The data recording apparatus 1 is characterized by the point that additional recording is performed a plurality of times while ensuring the compatibility with playback-only apparatuses with respect to a recording medium capable of recording only once, such as a DVD-R, CD-R, etc.

In order to allow files on a CD-R and a DVD-R to be modified virtually in the same manner as a hard disk, OSTA added a Virtual Allocation Table and a method of recording using a Virtual Partition Map to the UDF standard. However, many of disc-playback-only do not include a VAT technique. Thus, if additional recording is performed using VAT, disc-playback-only apparatuses are not in a state of allowing playing back and the compatibility will be lost. Thus, the data recording apparatus 1 according to the present embodiment keeps disc-playback-only apparatuses in a state of always allowing to be played back by performing additional recording on an optical disc without using a VAT.

As already described, in the UDF, by adopting a packet-writing method, data is written with a packet structure in which a link block and four Run-In areas are provided before user data, and two Run-Out areas are provided at the end of the user data. The seven blocks are used as link areas (Linking Area), which are junction areas between adjacent packets except for the user data area. Also, in the case of a disc allowing recording only once, such as a DVD-R, a CD-R, etc., data must be written continuously (incrementaly) toward the outer circumference without placing any free logical sectors.

Figure 3:
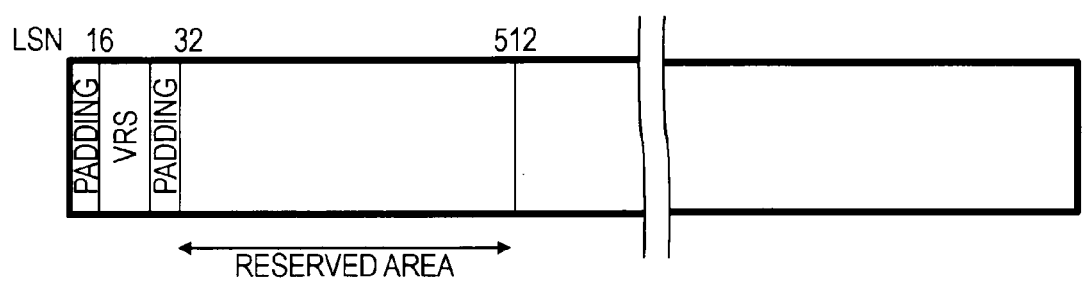
FIG. 3 is a diagram illustrating a data layout immediately after performing initialization processing on an optical disc.

FIG. 3 illustrates a data layout immediately after performing initialization processing on an optical disc.

After performing padding (padding) the logical sectors (Logical Sequence Number: LSN) from the innermost circumference to the 15th logical sector towards the outer circumference, the standard information called a VRS (Volume Recognition Sequence) is written from the 16th logical sector. The VRS includes one or a plurality of volume structure descriptors (Volume Structure Descriptor) describing information, such as a type of volume structure, an identification, version information. The contents of VRS themselves do not directly relate to the gist of the present invention, and thus no more descriptions will be given here. The padding is the processing for overwriting a recording medium with corresponding invalid packets so as not to cause a problem at the time of decoding a stream.

When the writing of VRS is completed, next, dummy data is recorded in the surplus area until the 31st logical sector to perform padding, and the formatting processing is completed.

The unrecorded area from the 512th logical sector and after is a space for recording a partition (Partition), that is to say, user data files, and the file system data on the files, and the configuration thereof is defined in the VDS (described below). In the partition, it is possible to record file data and the file system data related to this in compliance with the UDF file system by the packet-writing method.

The reserved area up to the 511th logical sector is an area reserved in order to write predetermined file system data, whose contents are determined at the stage of completing additional recording on a disc at the time of performing special processing, such as finalization. At initialization time, such file system data cannot be written. In the case of a recordable disc, such as a DVD-R, a CD-R, etc., data must be written from the logical sector immediately after the recorded area continuously (incremental) without leaving unrecorded area. If the writing of user data is started from immediately after the VRS, it becomes impossible to write the file system data in this area any more. At the same time, if the file system data in written in this area, the contents of the disc is fixed, and it becomes impossible to additionally record after that. Thus, by placing a reserved area, the writing of data was made possible from the logical sector immediately after the reserved area while keeping a state of allowing to write the file system data at the time of special processing, such as finalization, etc.

The file system data to be written finally in the reserved area, mentioned here, is specifically an AVDP (Anchor Volume Descriptor Pointer). The AVDP is pointer information pointing to a VDS (Volume Descriptor Sequence) describing information on the contents of a volume structure, such as pointer information to a root directory.

In the UDF, a VDS is allowed to be freely placed in the volume structure (packet structure), in which packets were written. At the same time, as one of restrictions and essential conditions on writing data, it is determined that AVDPs are recorded at least in two places out of three places of the 256th logical sector, the last recorded sector number N, and a logical sector number less than 256 sectors from N. Accordingly, for the file data in the partition, it is possible to access in the order of: AVDP→VDS→FSD (File Set Descriptor)→File Entry (File Entry: FE) of the root directory→information control block (Information Control Block: ICB) of the root directory→file identification information descriptor (File Identification Descriptor: FID) in the root directory→ICB of the file→data. In order to perform disc playback complying with the UDF, it is necessary to analyze the VDS, and for accessing the VDS, the above-described arrangement on the placement of AVDP is very important.

In the case of an optical disc capable of recording only once, there is no content in the volume structure immediately after the initialization, the VDS is not described, and thus there is no AVDP. Also, the contents of the final AVDP is not fixed until additional recording on a disc is completed. If an AVDP is recorded in the 256th logical sector at the time of initialization processing, the VDS information is fixed at that point in time, and it becomes impossible to additionally record on this optical disc in compliance with the UDF after that.

It is possible to meet the above-described restrictions and essential conditions defined by the UDF without providing a reserved area and by starting the writing of user data immediately after the VRS, and always writing AVDPs in two places of the 256th logical sector, the last recorded sector number N and a logical sector number less than 256 sectors from N in each packet structure each time additional recording is performed on the disc. In this case, of course, it becomes impossible to place an AVDP in the 256th logical sector.

However, the AVDP placed at the outer circumference is prone to damage by the fingertips of the user who is handling the disc, and the AVDP of the inner circumference, namely the 256th logical sector is difficult to be damaged. Thus, there is a request to write AVDP in the 256th logical sector. Also, in particular, playback-only apparatuses manufactured at a low cost are sometimes capable of reading only the AVDP of the 256th logical sector, and thus it is not possible to ensure compatibility unless an AVDP of the 256th logical sector number must be written.

Thus, as shown in FIG. 3, in the present embodiment, by assigning an area from immediately after the place in which the VRS is written at initialization time to the place of the 512nd logical sector number to a reserved area, it becomes possible to keep a state in which an AVDP can be written in the 256th logical sector number in the future, and data writing can be started from the 512nd and after.

Figure 4:
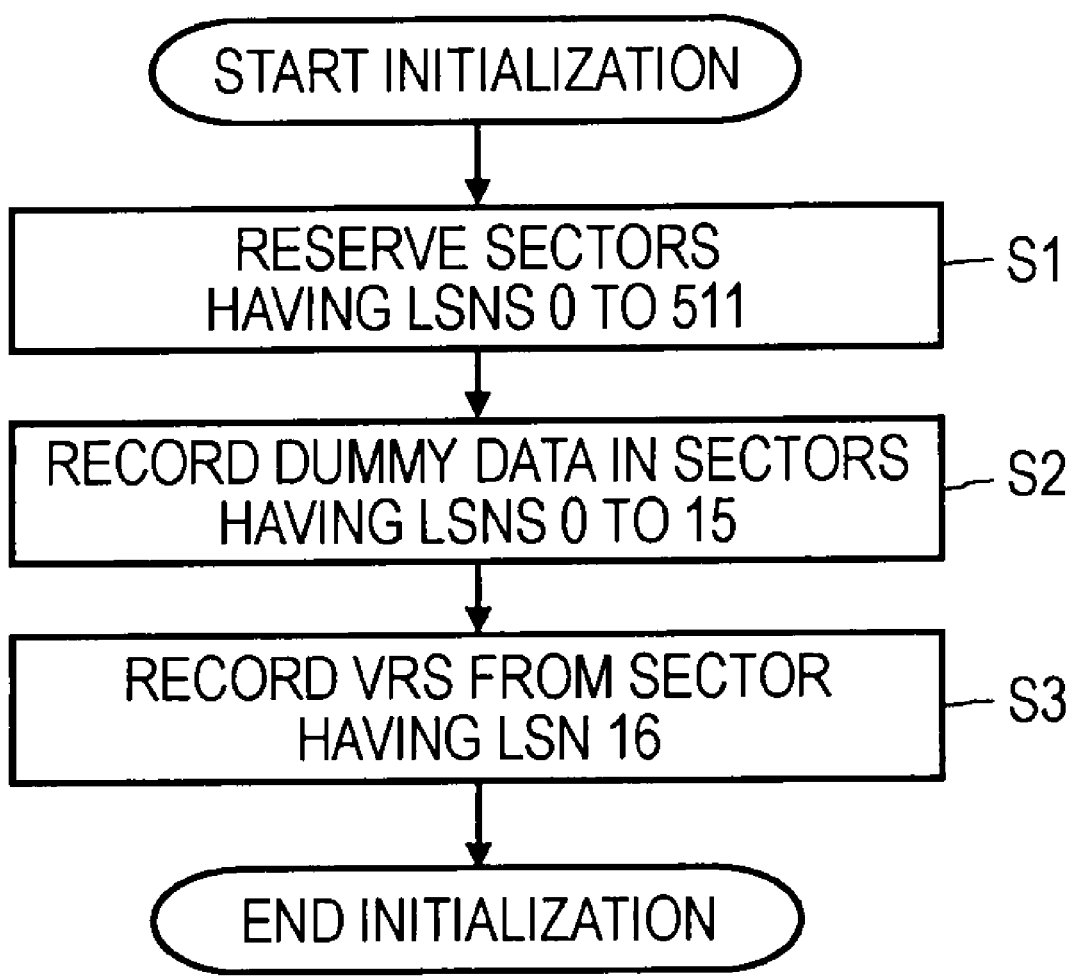
FIG. 4 is a flowchart illustrating a processing procedure for formatting an optical disc.

FIG. 4 illustrates a processing procedure for formatting an optical disc in a form of a flowchart.

First, an area having logical sector numbers 0 to 511 is reserved (step S1).

Next, dummy data is recorded in an area having sector numbers 0 to 15, the area is padded (step S2), and then a VRS, which is one piece of standard information defined by the UDF is recorded, from the sector having a logical sector number of 16 (step S3), and the formatting of the disc is terminated.

Figure 5:
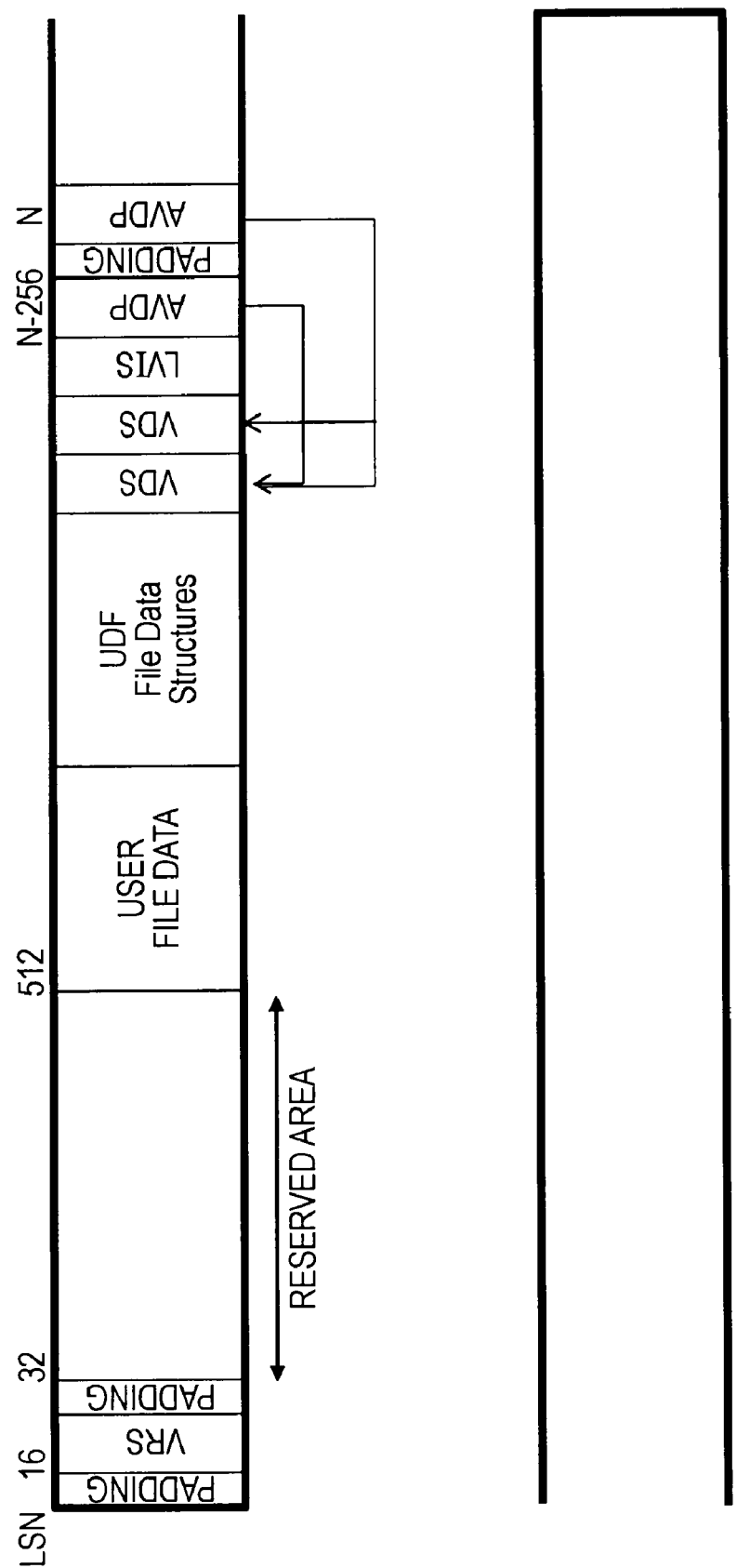
FIG. 5 is a diagram illustrating a data layout after performing additional recording once on an optical disc having been subjected to the initialization processing with the data layout shown in FIG. 3.

FIG. 5 is illustrates a data layout after performing additional recording once on an optical disc having been subjected to the initialization processing with the data layout shown in FIG. 3.

A packet-writing method is applied to writing on a disc (described above). The writing of the user file data is started from the 512th logical sector immediately after the reserved area, and next, the file system data related to this is written.

The file system data includes the UDF file data structure describing the information on the UDF file system, VDS, LVIS, AVDP, etc.

The VDS (Volume Descriptor Sequence) includes basic information on the file system structure in the optical disc, in which information on the content of the volume structure is described, such as the start positions of partitions (Partition) and LVIS (Logical Volume Integrity Sequence), and pointer information to the root directory.

The LVIS is the data including information on the state of an optical disc, for example free area size and the number of files of the optical disc.

The AVDP (Anchor Volume Descriptor Pointer) is the data including information on the start position and the size of the VDS.

In the UDF, in the volume structure in which packet writing has been performed, VDS and LDVIS are freely placed. However, it is determined that two VDSs are placed, and an AVDP is recorded at least in the two places out of three places of the 256th logical sector (1st AVDP), the last recorded sector number N, and a logical sector number less than 256 sectors from N (2nd AVDP and 3rd AVDP). Also, the surplus area between the 2nd AVDP and the 3rd AVDP is subjected to padding.

As shown in FIG. 5, in a state in which additional recording is yet to be performed on a disc (that is to say, in a state in which finalization processing has not been performed), the final AVDP cannot be written in the 256th logical sector. The AVDP is recorded in two places, the last recorded sector number N at this point in time and a logical sector number less than 256 sectors from N, and thus it is possible to prevent conflicting with the UDF format and to ensure compatibility with disc playback apparatuses.

Figure 6:
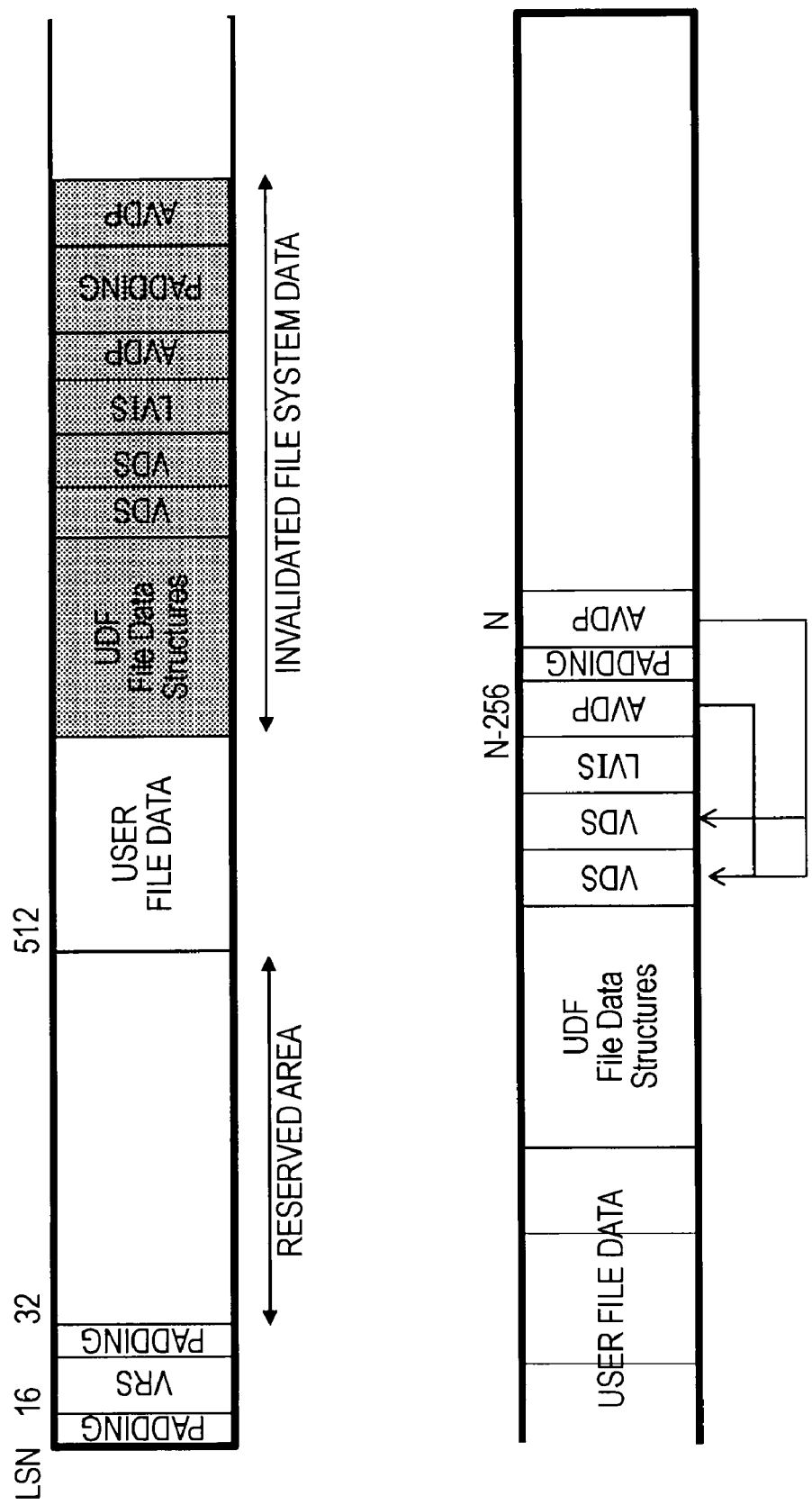
FIG. 6 is a diagram illustrating a data layout after performing further additional recording once on an optical disc having been subjected to the additional recording once shown in FIG. 5.

FIG. 6 illustrates a data layout after performing further additional recording once on the optical disc having been subjected to the additional recording once shown in FIG. 5.

A packet-writing method is applied to writing on a disc (described above). Following the last sector of the recorded area, the writing of user data file is started without leaving unrecorded logical sectors, and the file system data is written immediately after that.

The file system data includes information on the UDF file structure, FSDS, VDS, LVIS, AVDP, etc., individual AVDPs placed at the last recorded sector number N, and a logical sector number less than 256 sectors from N point to respective VDSs, and the surplus area between the two AVDPs are subjected to padding.

Also, each time additional recording is performed on a disc, each AVDP newly written does not point to an old VDS, and thus the file system data recorded before is not referenced from newly recorded file system data, thereby the data becomes invalid data.

As shown in FIG. 6, in a state in which additional recording is still performed on a disc (that is to say, in a state in which finalization processing has not been performed), the final AVDP cannot be written in the 256th logical sector. The AVDP is recorded in two places, the last recorded sector number N at this point in time and a logical sector number less than 256 sectors from N, and thus it is possible to prevent conflicting with the UDF format and to ensure compatibility with disc playback apparatuses.

Figure 7:
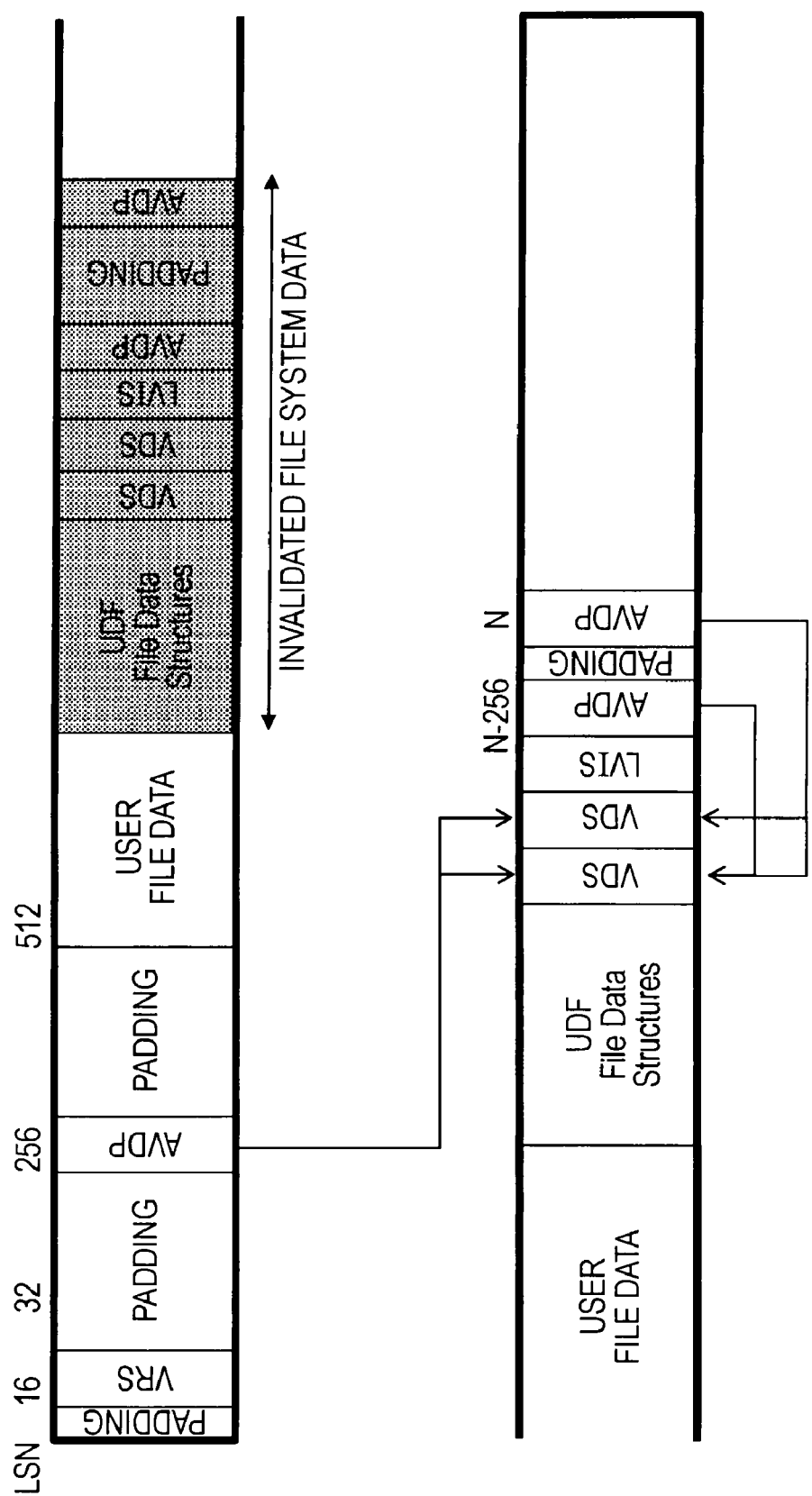
FIG. 7 is a diagram illustrating a data layout after performing finalization processing on the optical disc shown in FIG. 6.

FIG. 7 illustrates a data layout after performing finalization processing on the optical disc shown in FIG. 6.

As shown in FIG. 6, from the 32nd logical sector to the 511st logical sector, which is the sector immediately before the sector on which first user data file is recorded is a reserved area.

In the finalization processing, the recording of AVDP is started from the 256th logical sector in accordance with the restrictions and essential conditions on data writing in the UDF. Next, dummy data is written from the 32nd logical sector to the 255th logical sector, immediately before the place where AVDP is recorded, and from the place immediately after AVDP is recorded to the 511st logical sector, and the sectors are subjected to padding.

The AVDP recorded from the 256th logical sector points to the two VDSs in the file system data, which were recorded by the last additional recording, the VDS information is fixed at this point in time, and it becomes impossible to additionally record on this optical disc in a format complying with the UDF after this.

By the two AVDPs in the file system data, which was recorded by the last additional recording, it is also possible to meet the restrictions and essential conditions on the data writing in the UDF. However, the AVDP placed at the outer circumference is prone to damage by the fingertips of the user who is handling the disc. In contrast, the AVDP of the inner circumference, namely the 256th logical sector is difficult to be damaged. Also, there are playback-only apparatuses capable of reading only the AVDP of the 256th logical sector, and thus it is possible to widely ensure the compatibility with the data layout shown in FIG. 7.

Figure 8:
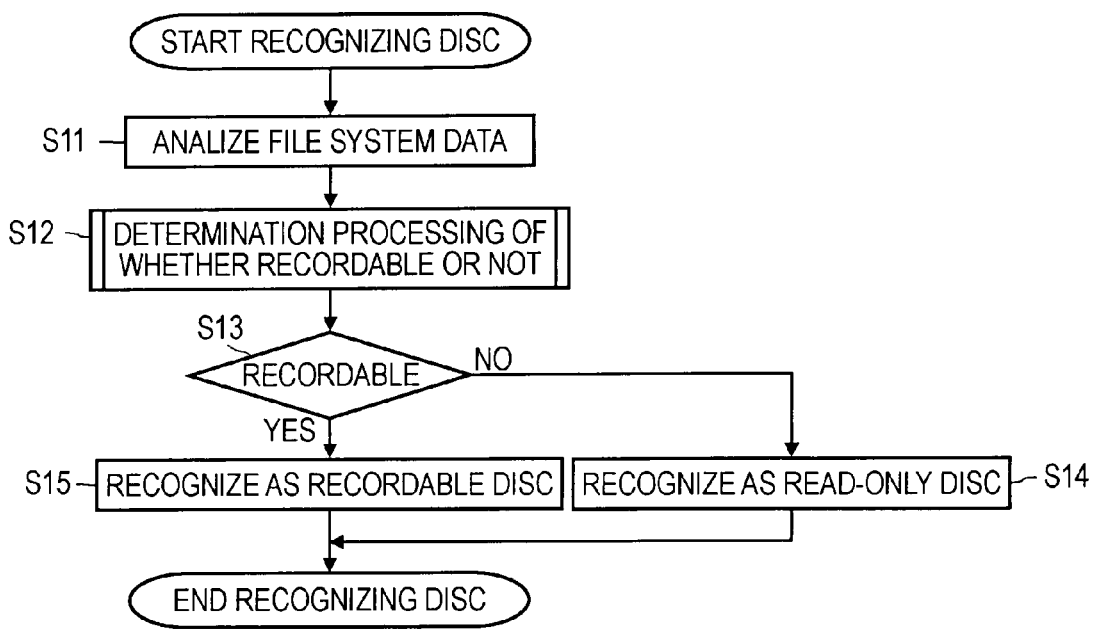
FIG. 8 is a flowchart illustrating a processing procedure to be performed when a disc is newly loaded into the recording section 4.

FIG. 8 illustrates a processing procedure to be performed when a new disc is loaded into the recording section 4 in a form of a flowchart.

First, the outermost circumference of the recorded area or the 256th logical sector is accessed to obtain the file system data, and the analysis thereof is performed (step S11).

Next, a determination is made on whether a loaded disc is recordable (step S12). This determination processing is defined separately.

Here, if it is determined to be not recordable, it is recognized as a read-only disc (step S14) thereafter, and if it is recognized as recordable, it is recognized as a recordable disc (step S15) thereafter.

Figure 9:
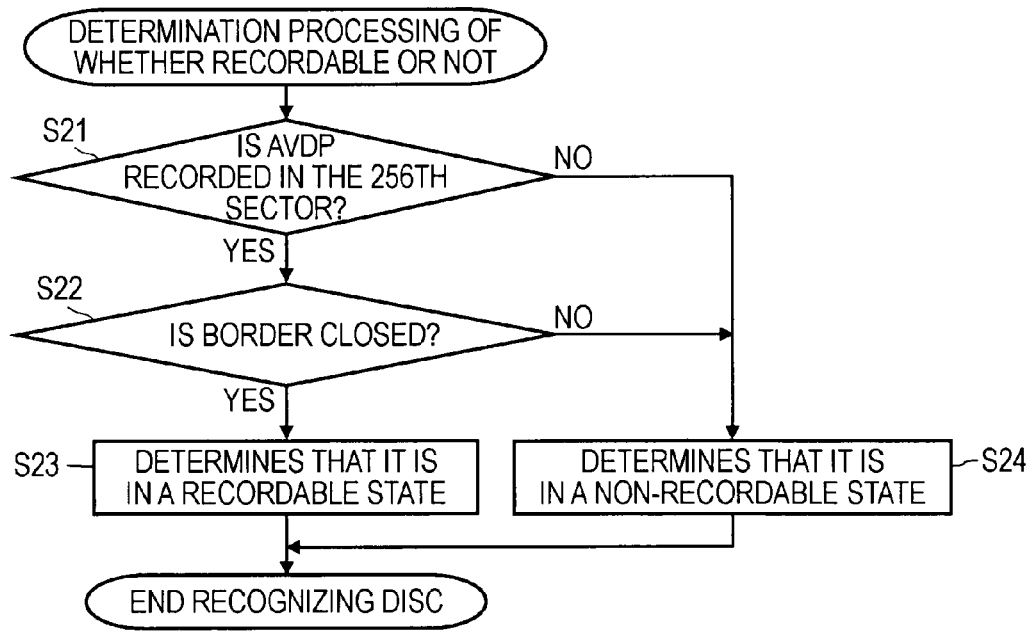
FIG. 9 is a diagram illustrating a procedure of determination processing of whether additional recording on a disc is possible or not when the disc is formatted as shown in FIG. 3.

FIG. 9 illustrates a procedure of determination processing to be executed by step S12 of the flowchart shown in FIG. 8, of whether additional recording on a disc is possible or not.

First, the 256th logical sector is accessed, and whether an AVDP is recorded is checked (step S21).

If an AVDP is recorded in the 256th logical sector, next, whether the border of the recording area is closed is checked (step S22).

If the border is closed, the disc is determined to be in a recordable state (step S23).

On the other hand, if an AVDP is not recorded in the 256th logical sector, or if an AVDP is recorded in the 256th logical sector but the border is not closed, the disc is determined to be not recordable (step S24).

Figure 10:
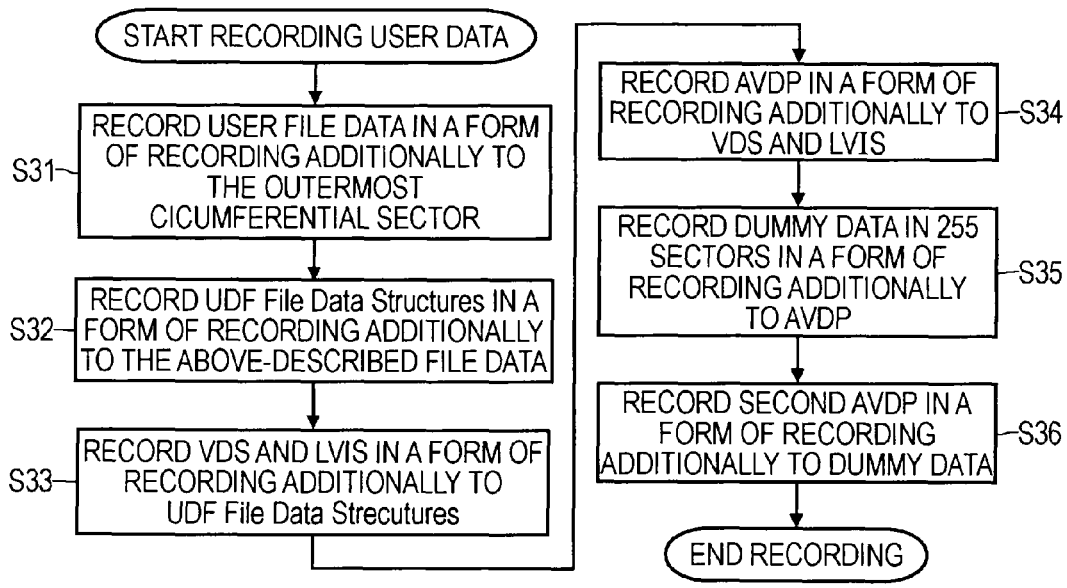
FIG. 10 is a flowchart illustrating a processing procedure for recording user data onto a disc after having been formatted.

FIG. 10 illustrates a processing procedure, in a form of a flowchart, for recording user data onto a disc after having been formatted (including a disc of after additionally recording and before finalization processing).

First, file data is recorded in a form of recording additionally to a file in a logical sector of the outermost circumference of the recorded area (step S31).

Next, the UDF file data structure is recorded in a form of recording additionally to the above-described file data (step S32).

Next, two VDSs and LVIS are recorded in a form of recording additionally to the above-described UDF-file data structure file data (step S33). In the volume structure, a VDS and a LVIS are freely placed.

Next, AVDPs are recorded in a form of recording additionally to the above-described VDS and LVIS (step S34). The AVDPs indicates the two VDSs, respectively.

Furthermore, dummy data is recorded in 255 sectors in a form of recording additionally to the AVDP, the sectors are subjected to padding (step S35), and then the AVDPs pointing to the two VDSs, respectively are recorded in a form of recording additionally to the dummy data (step S36).

Figure 11:
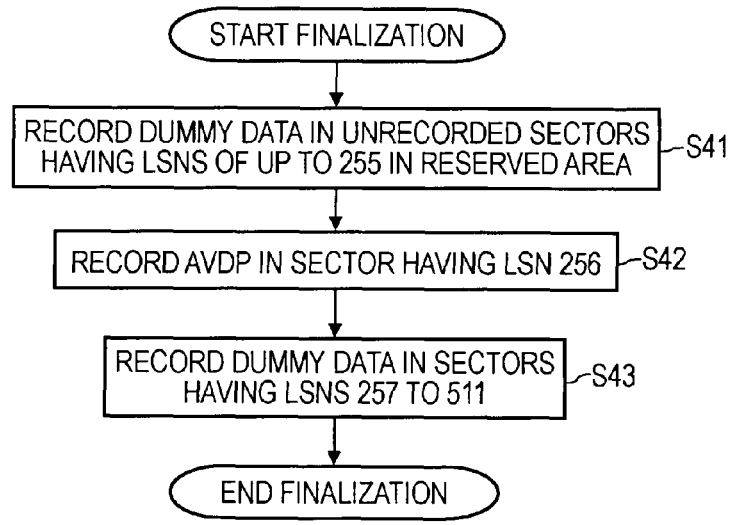
FIG. 11 is a flowchart illustrating a processing procedure for finalizing a disc.

FIG. 11 illustrates, in a form of a flowchart, a processing procedure for finalizing an optical disc.

First, dummy data is recorded in an area having logical sector numbers up to 255 in the area reserved at the time of disc formatting, and the area is subjected to padding (step S41).

Next, an AVDP is recorded from the 256th logical sector (step S42). The AVDP recorded here points to the two VDSs in the file system data, which were recorded by the last additional recording, the VDS information is fixed at this point in time, and it becomes impossible to additionally record on this optical disc in a format complying with the UDF after this.

Then, dummy data is recorded in a surplus reserved area from the position on which AVDP has been recorded to the 511th logical sector, the area is subjected to padding (step S43), and the finalization processing is terminated.

INDUSTRIAL APPLICABILITY

In the above, a detailed description has been given of the present invention with reference to the specific embodiment. However, it is apparent that those skilled in the art can make modifications and substitutions of the embodiments without departing from the spirit and the scope of the present invention.

In this specification, a description has been mainly given of an embodiment in which the present invention is applied to the case where additional recording is performed on an optical disc allowing recording only once in compliance with the UDF format defined by OSTA. However, the gist of the present invention is not limited to this. The same advantages can be obtained by applying the present invention to the case where the similar restrictions are imposed on a file system format such that when file system data having contents not fixed until the termination of additional recording is placed at the inner circumference, data must be continuously recorded from the innermost circumference. Also, the type of a recording medium is not specifically limited to an optical disc.

In summary, the present invention has been disclosed in the form of exemplification, and the contents of this specification should not be construed in a limiting sense. In order to determine the spirit and the scope of the present invention, the appended claims should be considered.

The invention claimed is:

1. A data recording apparatus for performing additional recording on a disc including a plurality of logical sectors in compliance with a predetermined file system format, in the predetermined file system format, reference information to file system data is determined to be recorded at least in two places out of three places of a first logical sector of a disc-inner circumference, a second and a third logical sectors of an inner circumference from a last-recorded logical sector, the data recording apparatus comprising:

disc-initialization means for recording standard information at a predetermined logical sector position from an innermost circumference of the disc, reserving an area from immediately after the recording of the standard information to immediately before a fourth logical sector being a file-data recording start position including the first logical sector, and performing initialization of the disc; and additional recording means for recording file data and file system data continuously from the fourth logical sector being immediately after the reserved area or a logical sector immediately after recorded area, and recording reference information to the file system data in two places, the second and the third logical sectors of an inner circumference from the last-recorded logical sector.

2. The data recording apparatus according to claim 1, wherein the predetermined file system format is a UDF (Universal Disk Format) determined by OSTA (Optical Storage Technology Association).

3. The data recording apparatus according to claim 1, further comprising finalization processing means, when the additional recording means completes additional recording on the disc, for padding with dummy data from an inner circumference of the reserved area to immediately before the first logical data, starting recording of reference information to file system data additionally recorded last from the first logical sector, and padding with dummy data an area from immediately after the recorded reference information to immediately before the fourth logical sector.

4. A method of recording data for additionally recording on a disc including a plurality of logical sectors in compliance with a predetermined file system format, in the predetermined file system format, reference information to file system data is determined to be recorded at least in two places out of three places of a first logical sector of a disc-inner circumference, a second and a third logical sectors of an inner circumference from a last-recorded logical sector, the method comprising the steps of:

disc-initializing for recording standard information at a predetermined logical sector position from an innermost circumference of the disc, reserving an area from immediately after the recording of the standard information to immediately before a fourth logical sector being a file-data recording start position including the first logical sector, and performing initialization of the disc;

additional recording for recording file data and file system data continuously from the fourth logical sector being immediately after the reserved area or a logical sector immediately after recorded area, and recording reference information to the file system data in two places, the second and the third logical sectors of an inner circumference from the last-recorded logical sector; and when completing additionally recording on a disc, finalization processing for padding with dummy data from an inner circumference of the reserved area to immediately before the first logical sector, starting recording of reference information to the last additionally recorded file system data, and padding with dummy data an area from immediately after the recorded reference information to immediately before the fourth logical sector.

5. A non-transitory computer readable storage media having stored therein computer readable instructions that when executed by a computer cause the computer to execute processing for performing additional recording on a disc including a plurality of logical sectors in compliance with a predetermined file system format, in the predetermined file system format, reference information to file system data is determined to be recorded at least in two places out of three places of a first logical sector of a disc-inner circumference, a second and a third logical sectors of an inner circumference from a last-recorded logical sector, the processing performed by the computer comprising the steps of:

disc-initializing for recording standard information at a predetermined logical sector position from an innermost circumference of the disc, reserving an area from immediately after the recording of the standard information to immediately before a fourth logical sector being a file-data recording start position including the first logical sector, and performing initialization of the disc;

additional recording for recording file data and file system data continuously from the fourth logical sector being immediately after the reserved area or a logical sector immediately after recorded area, and recording reference information to the file system data in two places, the second and the third logical sectors of an inner circumference from the last-recorded logical sector; and when completing additionally recording on a disc, finalization processing for padding with dummy data from an inner circumference of the reserved area to immediately before the first logical sector, starting recording of reference information to the last additionally recorded file system data, and padding with dummy data an area from immediately after the recorded reference information to immediately before the fourth logical sector.

* * * * *